United States Patent [19]
Ishimaru et al.

[11] Patent Number: 5,257,063
[45] Date of Patent: Oct. 26, 1993

[54] FLASHING CONTROLLER

[75] Inventors: Toshiaki Ishimaru, Hino; Satoshi Kawakami, Hachioji, both of Japan

[73] Assignee: Olympus Optical Co., Ltd., Tokyo, Japan

[21] Appl. No.: 954,499

[22] Filed: Sep. 30, 1992

[51] Int. Cl.$^5$ ............................................. G03B 15/05
[52] U.S. Cl. .................................... 354/416; 354/418; 354/421; 354/137
[58] Field of Search ............... 354/413, 416, 417, 418, 354/421, 137

[56] References Cited
U.S. PATENT DOCUMENTS
5,134,431 7/1992 Ishimura et al. .................... 354/416

FOREIGN PATENT DOCUMENTS
2-298924A 12/1990 Japan .

Primary Examiner—W. B. Perkey
Attorney, Agent, or Firm—Louis Weinstein

[57] ABSTRACT

The flashing controller according to the present invention comprises an optimal light value computer for computing an optimal quantity of light, a full flashing light value memory for storing an actual quantity of light for full flashing, a difference computer for computing a difference between a quantity of light for full flashing and an optimal quantity of light, and a difference output/flashing time memory for storing the relationships between the difference output and the flashing time of a flashing apparatus. For controlling the flashing time of a strobe, a difference between an actual quantity of light for full flashing and an optimal quantity of light is used to specify a flashing time. Then, a flashing time control controls flashing of a strobe circuit. Using the controller, influence of a reflector whose specifications tend to be determined at a late stage can be programmed independently during manufacturing. This helps reduce a production risk and improve precision in flashing control.

20 Claims, 12 Drawing Sheets

FLASHING CONTROLLER

BACKGROUND OF THE INVENTION

1. Field of the Invention

The present invention relates to a flashing controller, or more particularly, to a flashing controller for controlling a quantity of light by performing temporal control.

2. Description of the Related Art

With the development of an insulated gate bipolar transistor (hereafter, IGBT) or other device that is connected in series with a xenon flashtube of a strobe in a flashing apparatus and controls a flashing time merely by adjusting the gate voltage, a quantity of flashlight of a strobe in a flashing apparatus has come to be controlled temporally in recent years. The related arts have been proposed in conjunction with flashing controllers disclosed in Japanese Patent Laid-Open No. 2-298924 and U.S. Pat. No. 654818.

In the flashing controllers disclosed in the Japanese Patent Application Serial Laid-Open No. 2-298924 and U.S. Pat. No. 654,818, filed Feb. 13, 1991 and abandoned in favor of copending application Ser. No. 929,476, filed Aug. 17, 1992 a table defining the relationship between the Gv value specifying a quantity of strobe light required for optimal exposure and the flashing time is stored in the memory of a control circuit. Referencing the table, a flashing time of a strobe is retrieved according to a calculated Gv value permitting optimal exposure. The Gv value is a logarithm of a guide number (hereafter, G No) of a strobe and provided as the expression below.

$$Gv = \text{Log}_2 G\, No^2$$

FIG. 16 is a cross-sectional diagram of a flashing unit showing a flashing state of a conventional strobe. In FIG. 16, 51 denotes a reflector. 52 is a xenon flashtube. FIG. 17 shows a flashing circuit using an IGBT. In the flashing circuit, a charging circuit 54 driven by a power supply 53 loads a main capacitor 55 with a given electric charge, a flashing start signal from a flashing control circuit 56 is applied to a trigger electrode 57 to start flashing, then a flashing stop signal is applied to the IGBT 58 to stop flashing. Thus, an intended quantity of light is flashed.

However, even when the flashing time is controlled as mentioned above, a quantity of flashlight of a strobe may vary with the reflection state of the reflector 51 and depend on the characteristic of the xenon flashtube 52, the capacitance of the main capacitor, and the efficiency of the IGBT 58. To specify a quantity of light more reliably, the central values of the variations must be calculated. For this calculation, a tremendous amount of measured data is required. Furthermore, the characteristics of the above devices may not be established by a stage immediately before production. On the other hand, when a CPU employed for control circuits is mass-produced, programs must be completed about two months before the commencement of production. For the aforesaid prior art in which a flashing time is retrieved from a table listing quantities of light in association with flashing times, the table data may have been completed despite insufficient commitment to measurement and eventually incurred a serious designing risk. In particular, the shape of the reflector 51 tends to be determined at a late stage because it affects the appearance of a camera. This deprives the table of another necessary data.

OBJECTS AND SUMMARY OF THE INVENTION

The object of the present invention is to provide a flashing controller in which flashing characteristics depending on a xenon flashtube and other devices whose specifications are determined at a relatively early stage of development are stored in a control, the influence of a reflector whose specifications are usually determined at a late stage is written independently during manufacturing, a value as close as possible to an actual quantity of light can be designated as a quantity of flashlight to reduce a risk.

The flashing controller of the present invention is incorporated in a flashing apparatus for controlling a quantity of light by performing temporal control, as shown in the conceptual diagram of FIG. 1, comprising an optimal light value computing means 1 for computing an optimal quantity of light for a subject, a full flashing light value storing means 2 or a second storing means for storing an actual quantity of light for full flashing of a flashing apparatus, a difference computing means 3 for computing a difference between the quantity of light for full flashing and the optimal quantity of light, and a difference output/flashing time storing means 4 or a first storing means for storing the relationships between the difference output and the flashing time of the flashing apparatus. Each of the storing means 2 and 4 is formed with a nonvolatile memory.

Next, the operation of the foregoing flashing controller will be described. Assuming that a designed target G No and an actual G No are a G No i and a G No r respectively with a flashing time constant, since a quantity of light is proportional to the square of a G No, the relationship between the G Nos is represented as the following expression:

$$G\, No^2 = C \times G\, No\, i^2 \tag{1}$$

where, C is a value determined with a deviation from the target value for an individual strobe. Taking the logarithm of both sides, an actual Gv value, Gvr, is represented as follows:

$$Gvr = \text{Log}_2 G\, No^2$$

A Gv value, Gvi, is represented as:

$$Gvi = \text{Log}_2 G\, No\, i^2$$

A compensation value, Cv, corresponding to a Gv value or a logarithm of a deviation is provided as the following equation:

$$Cv = \text{Log}_2 C$$

Using these equations, the expression (1) is represented as follows:

$$Gvr = Gvi + Cv \tag{2}$$

According to the expression (2), the actual Gv value or Gvr is provided as a sum of the target Gv value, Gvi, and the compensation value, Cv. The compensation value Cv can be regarded constant in a range below full flashing. FIG. 2 shows characteristic curves plotted to show the relationships between the Gv value and the flashing time providing the respective Gv value. With a charging voltage of 330 V, when the characteristic curve for the designed target Gv value, Gvi, is shifted by the compensation value, Cv, to the right horizontally, the characteristic curve for the actual Gv value, Gvr, is provided. Therefore, if only a characteristic curve for the target Gv value and an actual Gv value for full flashing are available, a characteristic curve for the actual Gv value can be forecast. In FIG. 2, when the compensation value Cv is negative, the Gvi' characteristic curve is shifted to the left horizontally in order to provide a Gvr characteristic curve.

Then, in a flashing controller according to the present invention, for controlling a flashing time of a strobe, data representing the relationships between the difference from a Gv value for full flashing before correction, $\Delta Gv'$, and the flashing time providing the quantity of light for full flashing are stored in a difference output/flashing time storing means 4, which is based on a flashing characteristic of a xenon flashtube corresponding to the aforesaid Gv characteristic. On the other hand, an optimal light value computing means 1 computes a Gv value for an optimal quantity of light, Gvx. Then, the computed value is stored in a full flashing light value storing means 2. A difference computing means 3 computes a difference, $\Delta Gv$, from an actual Gv value for full flashing performed when a strobe is mounted actually, Gvm. Then, the difference $\Delta Gv$ is assigned to the difference Gv value, $\Delta Gv'$, in the difference output/flashing time storing means 4. Thus, the data representing the relationship between the difference output and the flashing time, which is pointed to by the difference $\Delta Gv$, is referenced to fetch a flashing time. After that, a flashing time controlling means 5 performs control flashing using a strobe circuit 6 so that strobe lighting will last for the flashing time. The thus calculated flashing time can be regarded almost equal to a flashing time of a strobe actually mounted, because, as described above, the characteristic curve of the quantity of flashlight versus the flashing time is shifted horizontally.

How to fetch the flashing time will be explained in conjunction with FIG. 2. The actual Gv value for full flashing, Gvm, corresponds to the full Gv value of the Gvr characteristic curve. The flashing time at a point a lowered by $\Delta Gv$ from the Gvm point is specified with a value of a flashing time at a point b that is shifted from the point a by a difference $\Delta Gv'$ equivalent to a difference output $\Delta Gv$ and located on a characteristic curve for the target Gv value, Gvi, stored in the difference output/flashing time storing means 4. The difference output Gv and difference $\Delta Gv'$ represent differences from a Gv value for full flashing, which will not be differentiated below but be denoted as $\Delta Gv$.

The other features and advantages of the present invention will be apparent from the description below.

DETAILED DESCRIPTION OF THE PREFERRED EMBODIMENT

Figure 1:
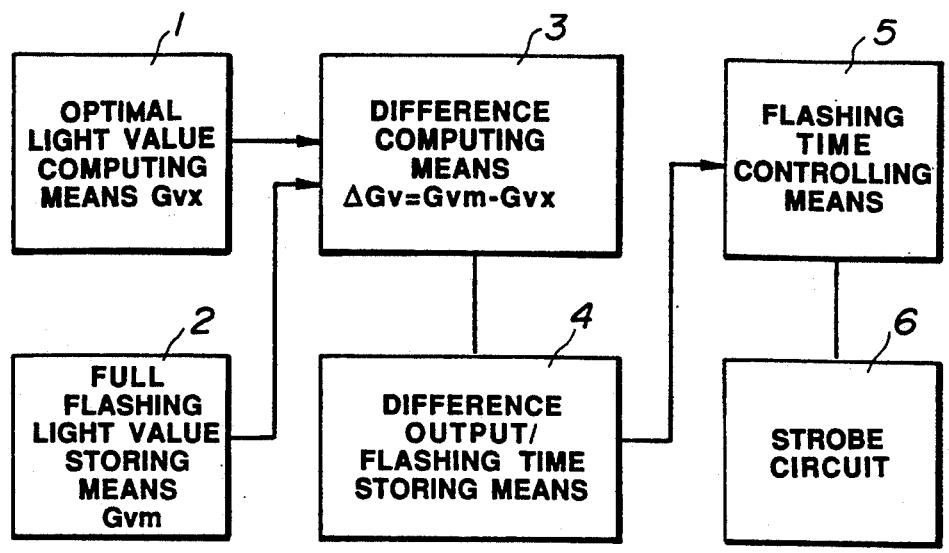
FIG. 1 is a block diagram showing the concept of the present invention.
Figure 2:
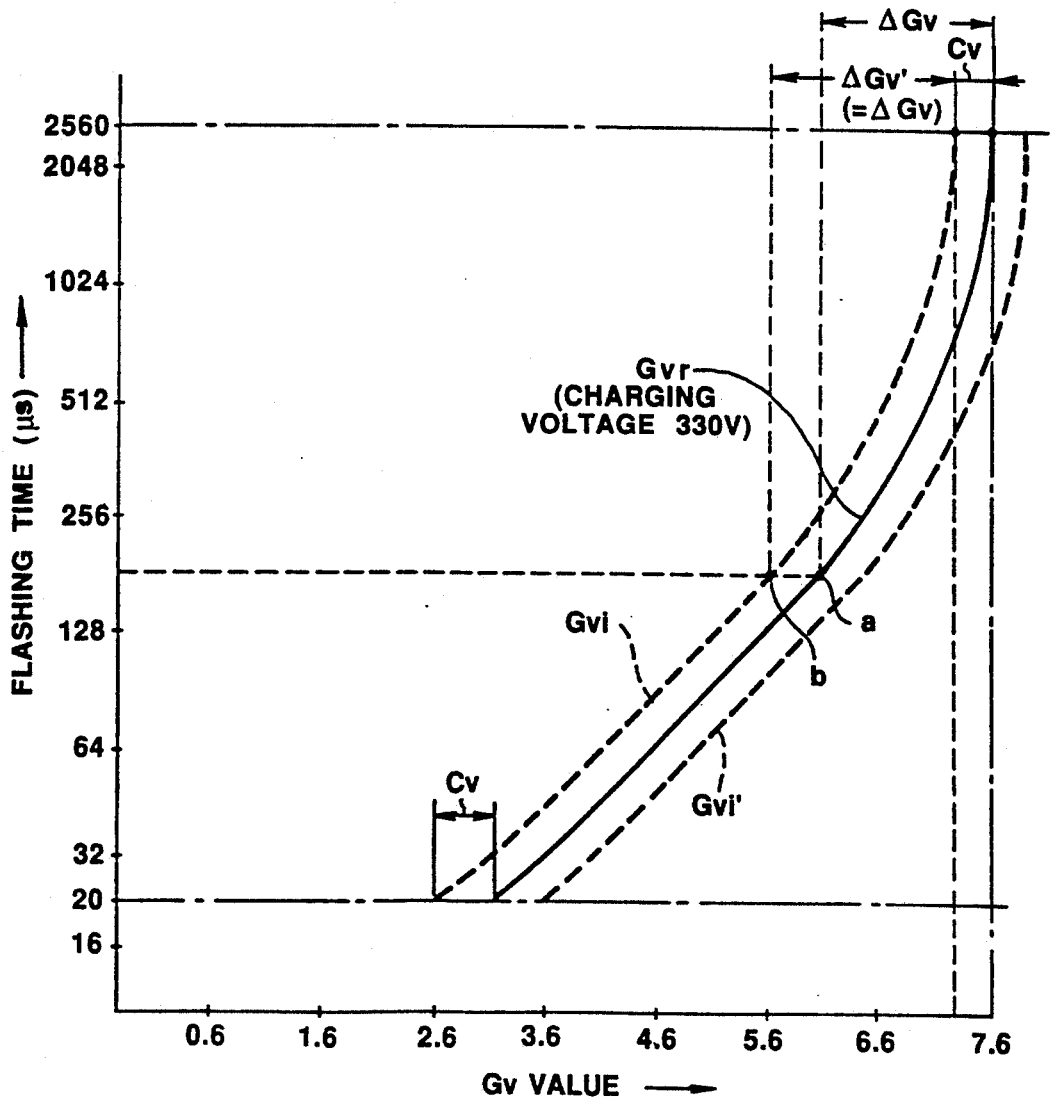
FIG. 2 is a graph of characteristic curves showing the relationships between the Gv value specifying a quantity of strobe light and the flashing time.

The present invention will be described in conjunction with an embodiment shown in the drawings.

Figure 3:
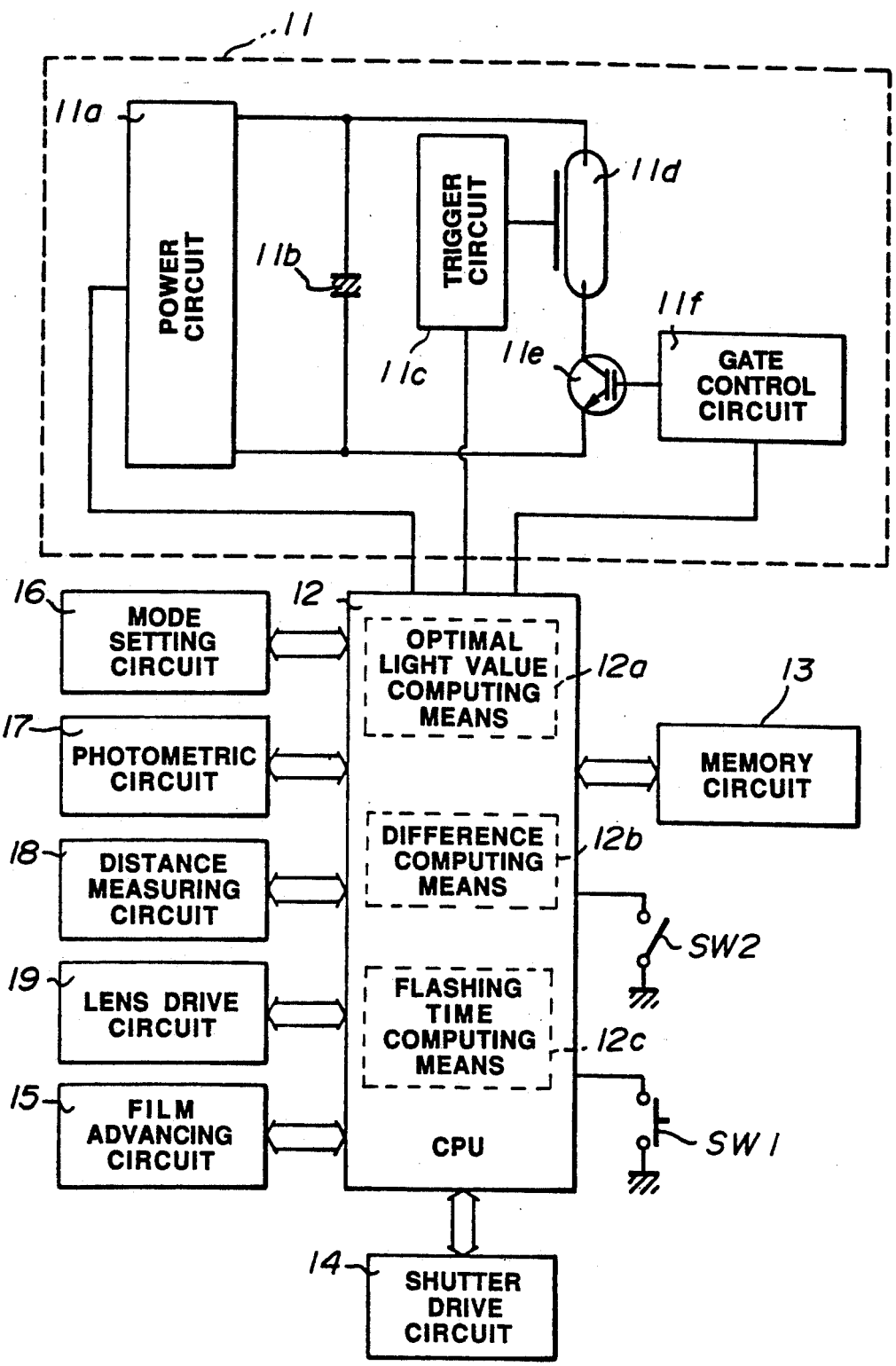
FIG. 3 is a block diagram showing the configuration of electric circuits in a camera having a built-in flashing controller of an embodiment of the present invention.

FIG. 3 is a block diagram of control circuits for a camera having a built-in flashing controller of an embodiment of the present invention. As shown in FIG. 3, all control devices of the camera are controlled by a CPU 12. A strobe circuit 11, one of the control circuits, comprises, as already known, a power circuit 11a, a main capacitor 11b, a trigger circuit 11c, a flashtube 11d, an IGBT 11e, and a gate control circuit 11f. The IGBT 11e is connected in series with the flashtube 11d. Under the control of the output of the gate control circuit 11f, the IBGT 11e controls the flashing time for the flashtube 11d in a known manner. In response to an output of the CPU 12 in the camera, the gate control circuit 11f controls the timing of turning on the IGBT 11e and the on period.

A photometric circuit 17, a component of the control circuits for the foregoing camera, meters a luminance of a subject in a known manner, and informs the CPU 12 of the luminance. Based on the data, the CPU 12 controls the exposure mechanism of the camera. A distance measuring circuit 18 calculates a distance to a subject. A lens drive circuit 19 drives a lens in the camera according to the output of the distance measuring circuit 18. A film advancing circuit 15 controls film advancing and rewinding in a known manner. A shutter drive circuit 14 controls a shutter mechanism in response to an output of the CPU 12. A mode setting circuit 16 allows a user to select a Strobe On or Off mode. A memory circuit 13 is formed with a nonvolatile memory E²-PROM or other memory element, incorporating a full flashing light value storing means serving as a second storing means, a difference output/flashing time storing means serving as a first storing means, and a third storing means. That is to say, the memory circuit 13 stores the number of exposed frames and camera states. The full flashing light value storing means stores Gvm values or Gv values specifying actual quantities of light for full flashing for a strobe. The difference output/flashing time storing means stores data of a table (Table 1 to be described later) showing the relationship between the difference output relative to a Gv value for full flashing before correction, $\Delta$Gv, and the flashing time. The third storing means stores data of a table (Table 2 to be described later) listing correction values for correcting a flashing characteristic depending on a charging voltage.

A switch SW1 is turned on when a release switch is pressed to the first step. A switch SW2 is turned on when the release switch is pressed to the second step.

In the CPU 12, an optimal light value computing means 12a, a difference computing means 12b, and a flashing time computing means 12c are incorporated. The optimal light value computing means 12a computes outputs of the photometric circuit 17 and of a film sensitivity entering means which is not shown to provide a Gv value specifying a quantity of strobe light permitting optimal exposure. The difference computing means 12b computes a difference Gv value, $\Delta$Gv, between a Gv value specifying an actual quantity of light for full flashing of a strobe, Gvm, and the optimal Gv value, Gvx, which are stored in the memory circuit 13, or a difference of Gvm minus Gvx. The flashing time computing means 12c references the table (Table 1) in the difference output/flashing time storing means in the memory circuit 13 and fetches a flashing time of a strobe pointed to by the difference Gv value, $\Delta$Gv. For instance, if the $\Delta$Gv is $-2.0$ (Ev), the flashing time of 125 us is retrieved. On the other hand, if the charging voltage is not the full, the CPU 12 references data of Table 2 and corrects the Gv value. The correction will be described in detail later.

Figure 4:
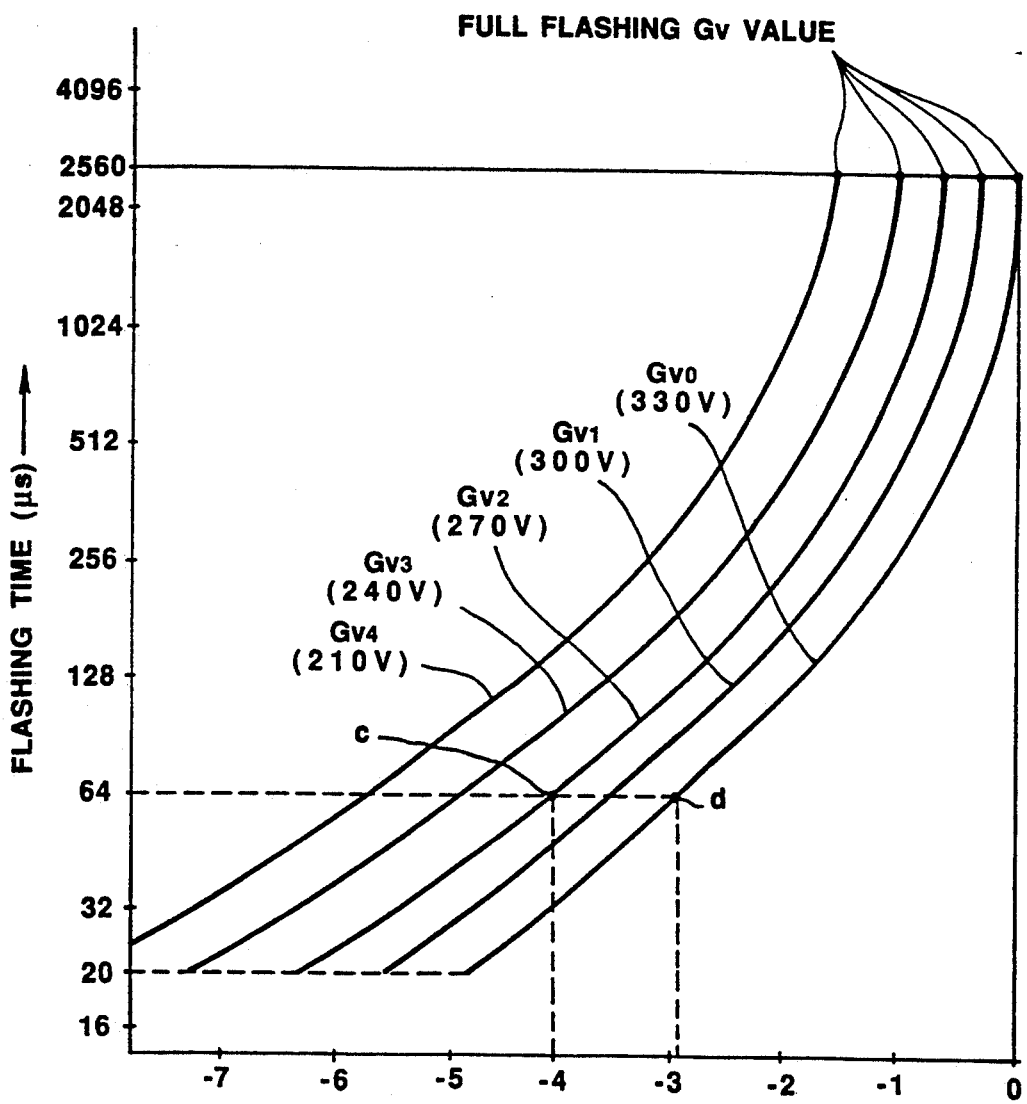
FIG. 4 is a graph of characteristic curves showing the relationships between the Gv value specifying a quantity of strobe light associated with a charging voltage and the flashing time for the camera shown in FIG. 3.

FIG. 4 is a graph of characteristic curves Gv0 to Gv4 each showing a change in flashing time relative to a difference from a Gv value for full flashing, $\Delta$Gv. Table 1 lists values of flashing times (unit: us) in association with differences $\Delta$Gv (unit: Ev) for the characteristics for full charging shown in FIG. 4.

TABLE 1

| Difference from a Gv value for full flashing, Gv (Ev) | Flashing time (µs) |
| --- | --- |
| 0 | 2560 |
| −0.5 | 500 |
| −1.0 | 260 |
| −1.5 | 180 |
| −2.0 | 125 |
| −2.5 | 90 |
| −3.0 | 60 |
| −3.5 | 45 |
| −4.0 | 35 |
| −4.5 | 30 |

In Table 2, deviations of flashing time characteristic curves of various charging voltages from characteristic curves for full charging and full flashing are regarded as steps or differences from a Gv value for full charging and full flashing, $\Delta$Gv (unit: Ev), and correction steps (unit: Ev) are listed in association with different numbers of steps.

TABLE 2

| Charging voltage | Step of Gv | | | |
| --- | --- | --- | --- | --- |
| | 1 or less | 1 to 3 | 3 to 5 | 5 or more |
| 315 V or more | 0 | 0 | 0 | 0 |
| 315 to 285 V | 0.4 | 0.5 | 0.6 | 0.9 |
| 285 to 255 V | 0.9 | 1.0 | 1.1 | 1.5 |
| 255 to 225 V | 1.3 | 1.4 | 1.7 | 2.1 |
| 255 V or less | 1.6 | 1.8 | 2.3 | 2.8 |

Unit: Ev

The data of Table 1 can be entered at an early stage of production, because all that should be measured is how many steps (represented as $\Delta$Gv) the quantity of light of a xenon flashtube unit drops relative to a quantity of light for full flashing as the flashing time passes, and a strobe reflector need not be mounted. Actual Gv values for full flashing, Gvm, are stored in an E²PROM or other rewritable nonvolatile memory so that other values can be written during manufacturing. Therefore, quantities of light can be measured carefully with a strobe reflector mounted and determined at as late a stage as immediately before the commencement of production. Thus, the present embodiment helps eliminate a conventional production risk and still controls strobe lighting with high precision. Even when a capacitor of a strobe is not fully charged, a Gv value can be corrected with high precision using the data of Table 2.

Next, the photographic sequence of the camera of this embodiment will be described in conjunction with the flowchart of FIGS. 5 to 8.

Figure 5:
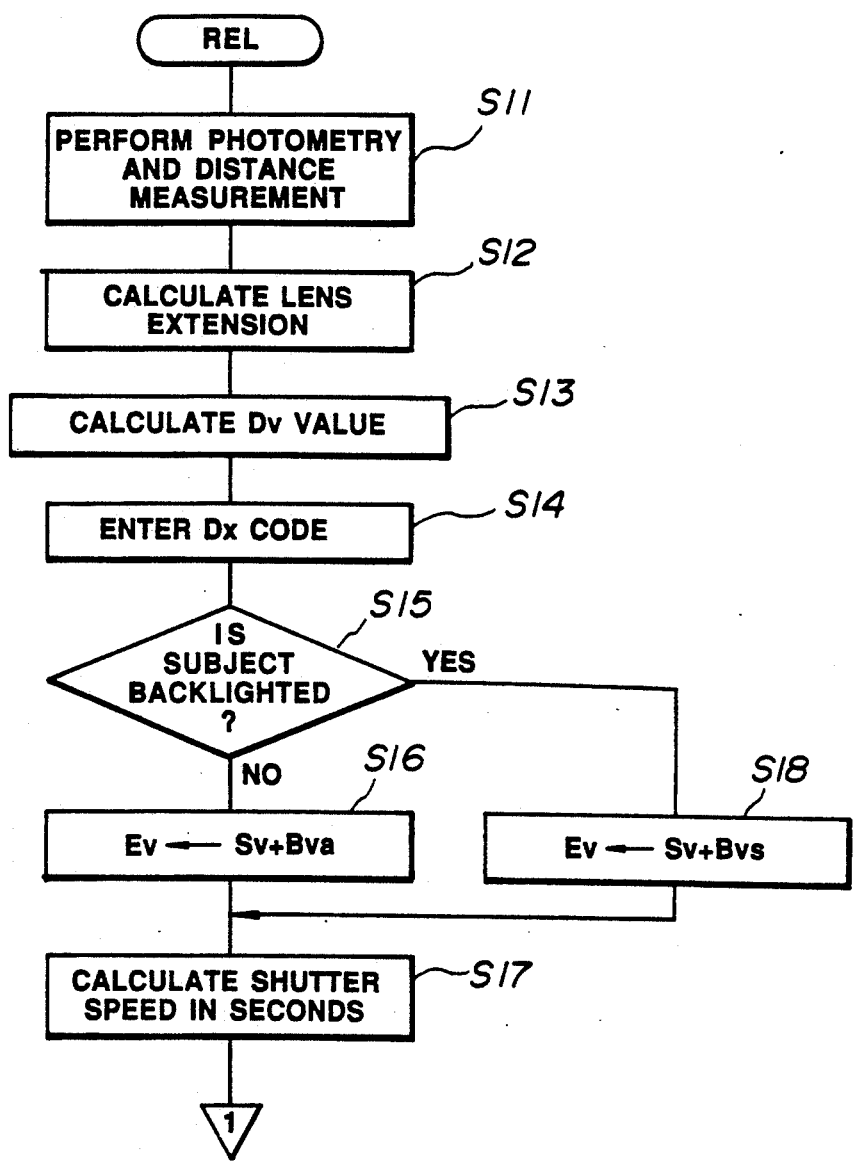
FIG. 5 is part of a flowchart for a subroutine REL called by a photographic sequence for the camera shown in FIG. 3.

When a release switch is pressed halfway or a SW1 at the first step is turned on, a subroutine REL of FIG. 5 is called. First, distance measurement and photometry are carried out. A lens extension and a logarithm, Dv, of a distance d to a subject ($Log_2 d^2$) are calculated. A Dx code of a film loaded is read out. Then, a Sv value (expressed as $Log_2$ (ISO sensitivity by 100)) or a logarithm of a sensitivity the code represents is calculated (steps S11 to 14).

At a step S15, assuming that the logarithms of luminance data at the center and periphery of a photometric receiving element are regarded as a central luminance value, Bvs, and a peripheral luminance value, Bva, when the Bvs is smaller by a given value than the Bva or the center is darker than the periphery, it is determined that subjects are backlighted. Then, control passes to a step S18. Then, the Sv and Bvs are added, and the sum is read as an exposure value, Ev. If the Bvs is larger by a given value than the Bva or the center is brighter than the periphery, it is determined that the subjects are not backlighted. Then, control passes to a step S16. Then, the Sv and Bva are added, and the sum is read as an Ev value. Based on the Ev, a shutter speed is calculated in seconds (step S17).

Figure 6:
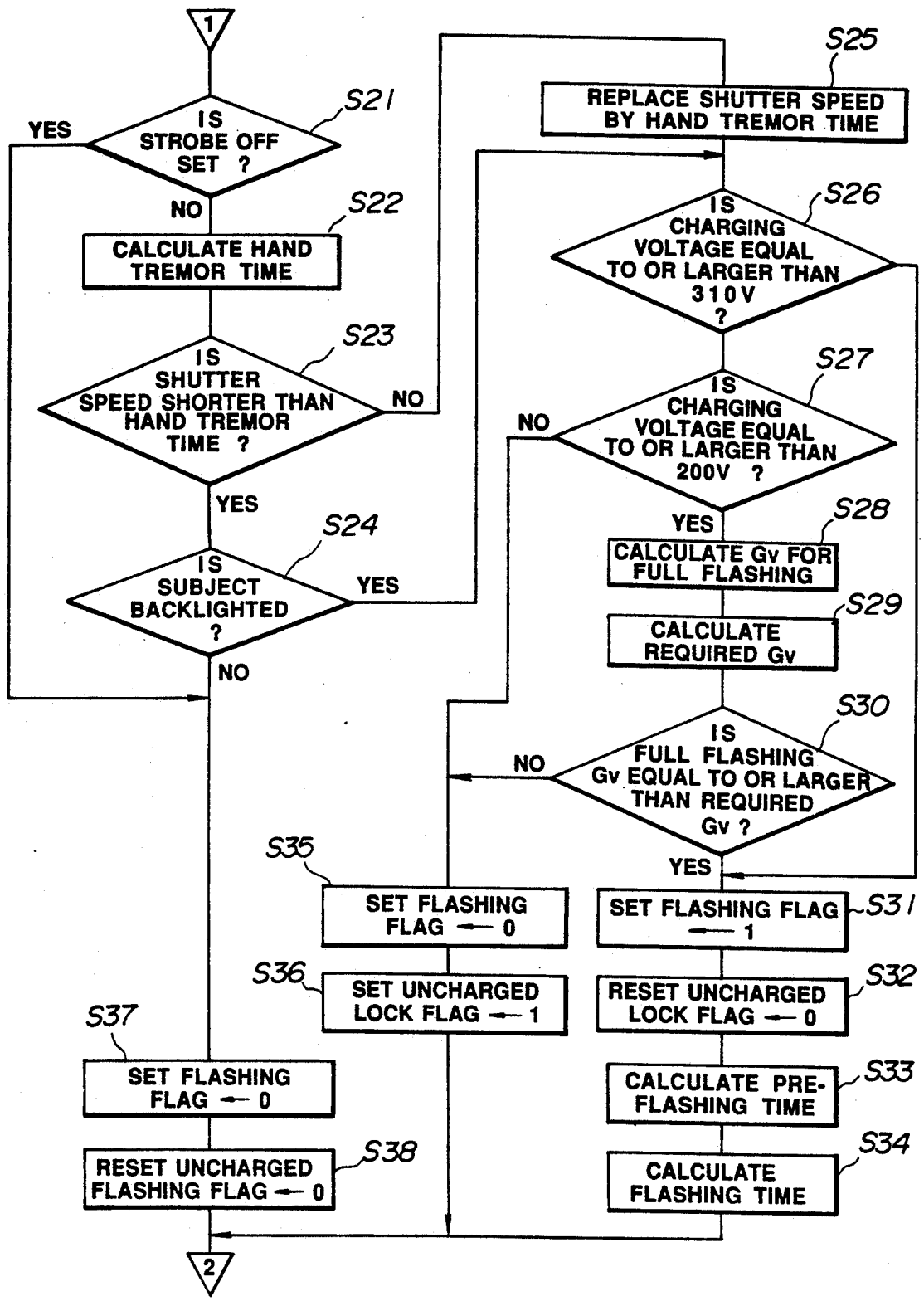
FIG. 6 is part of the flowchart for the subroutine REL called by the photographic sequence for the camera shown in FIG. 3.

Next, as shown in FIG. 6, it is determined at a step S21 whether or not to perform flashing. This camera supports two strobe modes; a normal mode in which strobe lighting is performed only when an Ev value is low and a Strobe Off mode in which strobe lighting is not done. Even when flashing is required, if necessary conditions are not met, exposure is disabled. At this time, when the release switch is pressed halfway, an LED in a finder is blinked to alarm a photographer. If it is determined at step S21 that the Strobe Off mode is specified, control jumps to a step S37. A flashing flag is reset to disable flashing. An uncharged lock flag is reset to enable exposure. Then, control passes to a step S40 in FIG. 7.

When the normal mode is specified, control passes to a step S22. Then, a hand tremor time is calculated depending on a zooming state. Then, the shutter speed calculated at the step S17 is compared with the hand tremor time. If the shutter speed is shorter and the subjects are not backlighted, the flashing flag is reset to disable flashing and the uncharged lock flag is reset to enable exposure (steps S23, 24, 37, and 38). Then, control passes to the step S40. If the shutter speed is longer than the hand tremor time, the shutter speed is replaced by the hand tremor time (step S25). Then, control passes to a step S26. If it is determined at the step S24 that the subjects are backlighted, control also passes to the step S26.

At the steps S26 and S27, a charging voltage is checked, and it is determined whether or not to enable flashing. Specifically, when the charging voltage is less than 200 V, there is a possibility that the charging voltage is too low for a strobe to flash. Control jumps to the steps S35 and S37. The flashing flag is reset to disable flashing and the uncharged lock flag is set to prevent, i.e. disable exposure. Then, control passes to the step S40. When the charging voltage is larger than 200 V and smaller than 310 V, control passes through steps S28, 29, to 30. Then, a Gv value for full flashing with the charging voltage is calculated (step S28). A Gv value for optimal exposure is specified with a Dv value indicating the distance to a subject and an Sv value indicating an ISO sensitivity, Gvx, is calculated (step S29). A Gv value one step lower than the optimal value permits satisfactory photography. From this viewpoint, a Gv value one step lower may be specified as a required Gv number. It the Gv value for full flashing is smaller than that for optimal exposure, photography cannot be done optimally. The flashing flag is reset to disable flashing and the uncharged lock flag is set to disable exposure. Then, control passes to the step S40.

When it is determined at the step S26 that the charging voltage exceeds 310 V or is larger than 200 V and smaller than 310 V, if the Gv value for full flashing is larger than that for optimal exposure, the flashing flag is set to enable flashing and the uncharged lock flag is reset to enable exposure (steps S31 and S32). Then, a pre-flashing time and a flashing time are calculated (steps S33 and S34). After that, control passes to the step S40. The flashing time is retrieved from a table (Table 1) in a difference output/flashing time storing means using a difference ΔGv between an actual Gv value for full flashing, Gvm, and a Gv value for optimal exposure, Gvx, which are stored in a memory circuit 13 as described previously. How to obtain a pre-flashing time will be described later.

Figure 7:
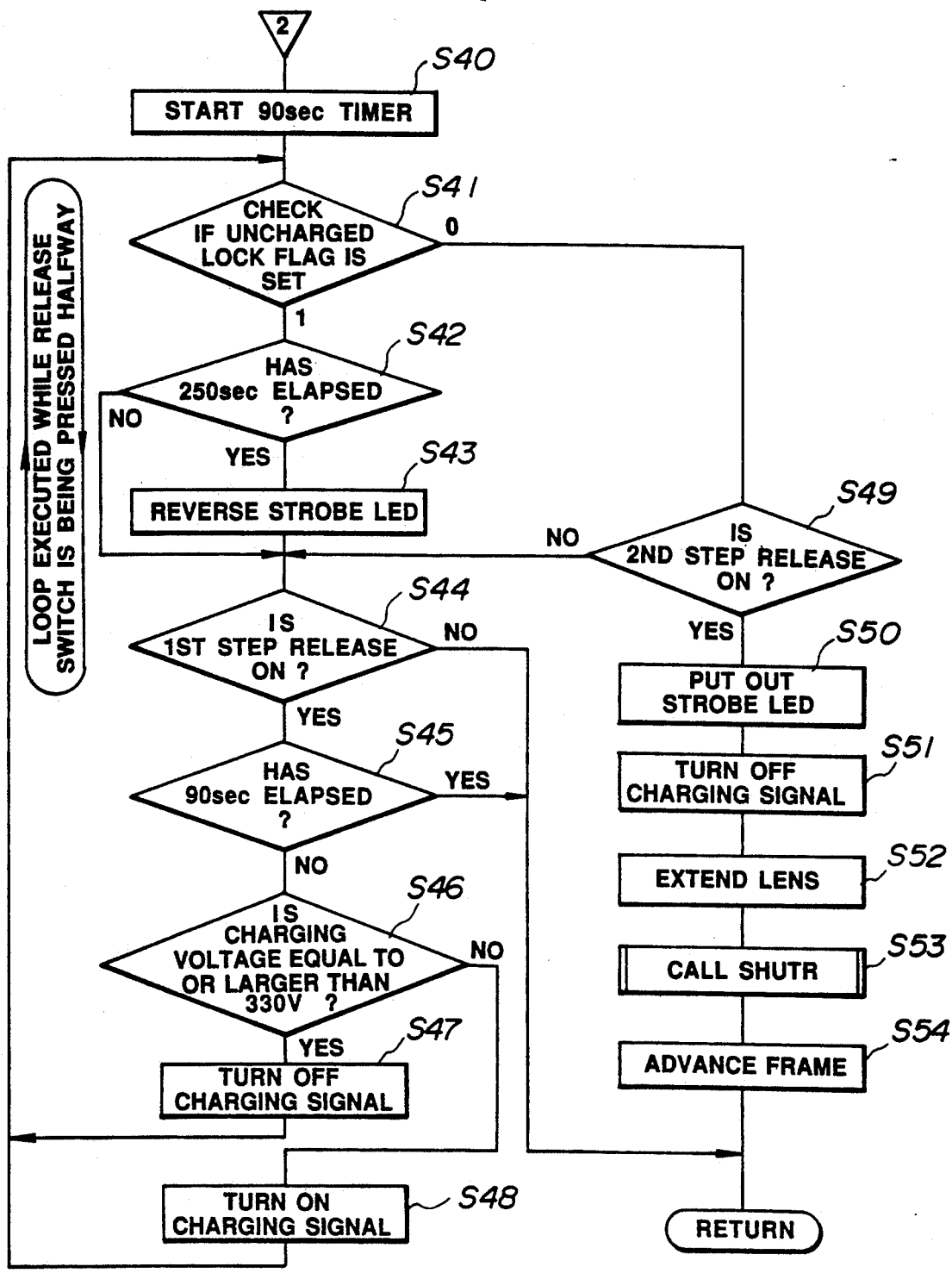
FIG. 7 is part of the flowchart for the subroutine REL called by the photographic sequence for the camera shown in FIG. 3.

As shown in FIG. 7, steps S40 and S48 make up a loop to be executed when the release switch is pressed halfway. At the step S40, a 90-sec timer starts counting down 90 seconds. Next, it is checked if the uncharged lock flag is set. If the flag is reset to a 0, exposure is enabled. Then, control passes to a step S49. It is checked if the second step switch SW2 of the release switch is on. However, when the uncharged lock flag is set to a 1, it is not checked if the second step switch SW2 of the release switch is on. The loop to be executed when the release switch is pressed halfway is repeated. Then, the display of the strobe LED is reversed at intervals of 250 us, reporting the photographer that the quantity of flashlight is too small to perform exposure (steps S42 and S43). Then, when the first step switch SW1 of the release switch is turned off or the 90-sec timer overflows, control escapes from the subroutine REL. Unless an overflow is detected in the timer, control passes to the step S46. Then, the charging voltage is checked. When the charging voltage has reached 330 V, a charging signal is turned off to stop charging. When the charging voltage is less than 330 V, the charging signal is turned on to continue charging. Then, control returns to the step S41. Then, the loop to be executed when the release switch is pressed halfway is continued.

If it is found at the step S49 that the second step switch SW2 is off, control returns to the step S44. If the SW2 is on, exposure is to be carried out. Therefore, control passes through the steps S50 to S53. The strobe LED is put out, the charging signal is turned off to stop charging, and the lens is extended to a focusing position. At a step S53, the subroutine SHUTR is called to control the shutter. After that, a film is advanced by one frame (step S54). Control escapes from the subroutine REL.

Figure 8:
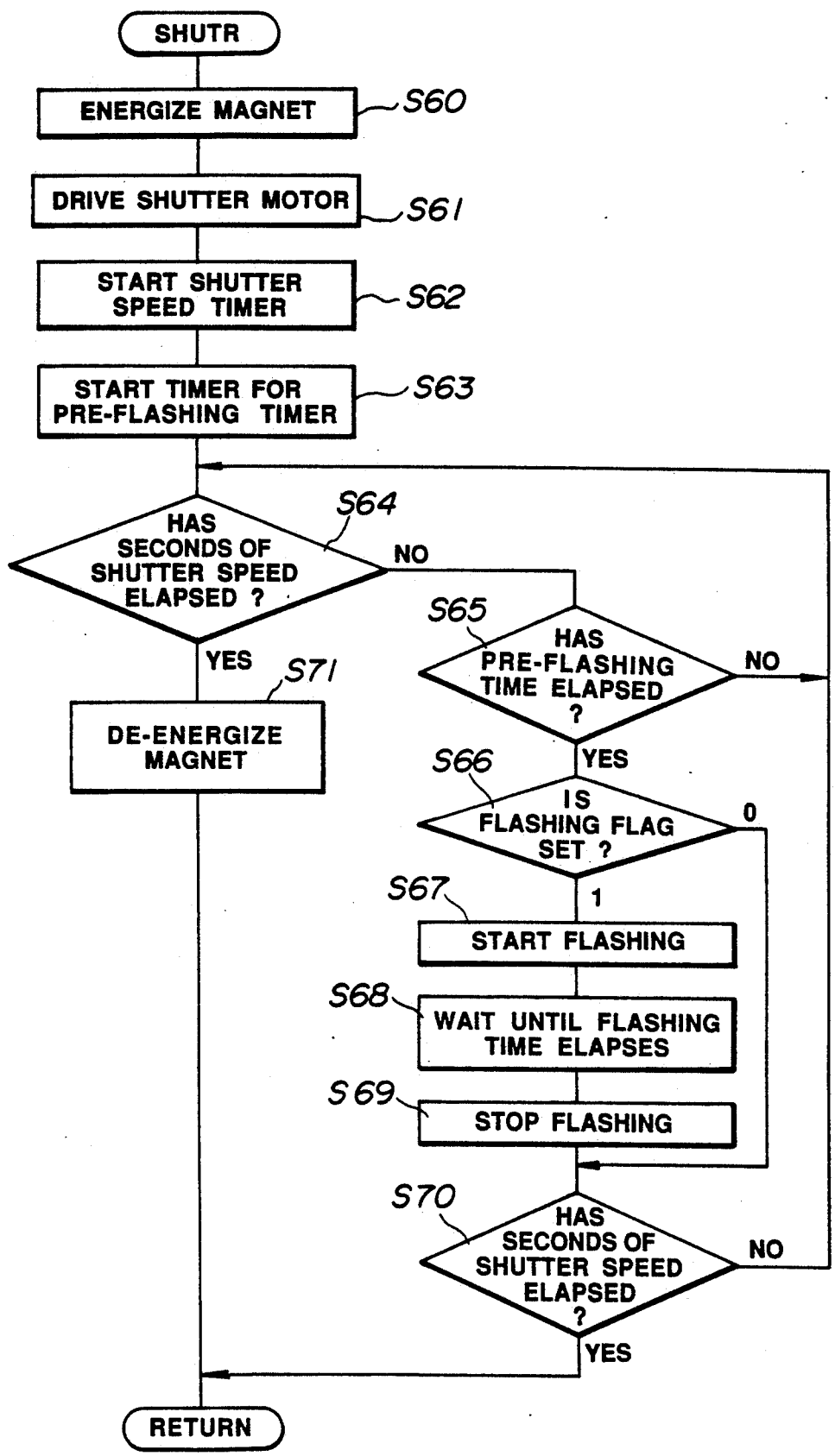
FIG. 8 is a flowchart for a subroutine SHUTR called by the subroutine REL shown in FIG. 7.

The subroutine SHUTR, as shown in FIG. 8, energizes a magnet for locking shutter blades, drives a shutter drive motor, and starts a shutter speed timer and a pre-flashing timer at steps S60 to S63. Then, it is determined at a step S64 or S65 whether seconds of a shutter speed required for optimal exposure have elapsed or whether a time before strobe lighting has elapsed. First, when the pre-flashing time has elapsed before the seconds of the shutter speed elapse, the state of the flashing flag is checked at a step S66. When the flag is reset to a 0, flashing is not performed but elapse of the seconds of the shutter speed is awaited at the steps S70 and S64. When the flag is set to a 1, flashing starts at S67, elapse of the flashing time specifying a required quantity of flashlight calculated at the step S34 is awaited at a step S68, then flashing is stopped at a step S69. Then, when the seconds of the shutter speed elapse, control passes to a step S71. Then, the magnet is de-energized. The loop of the subroutine SHUTR terminates.

Next, exposure control and flashing control applied to the camera will be described in detail.

Figure 9:
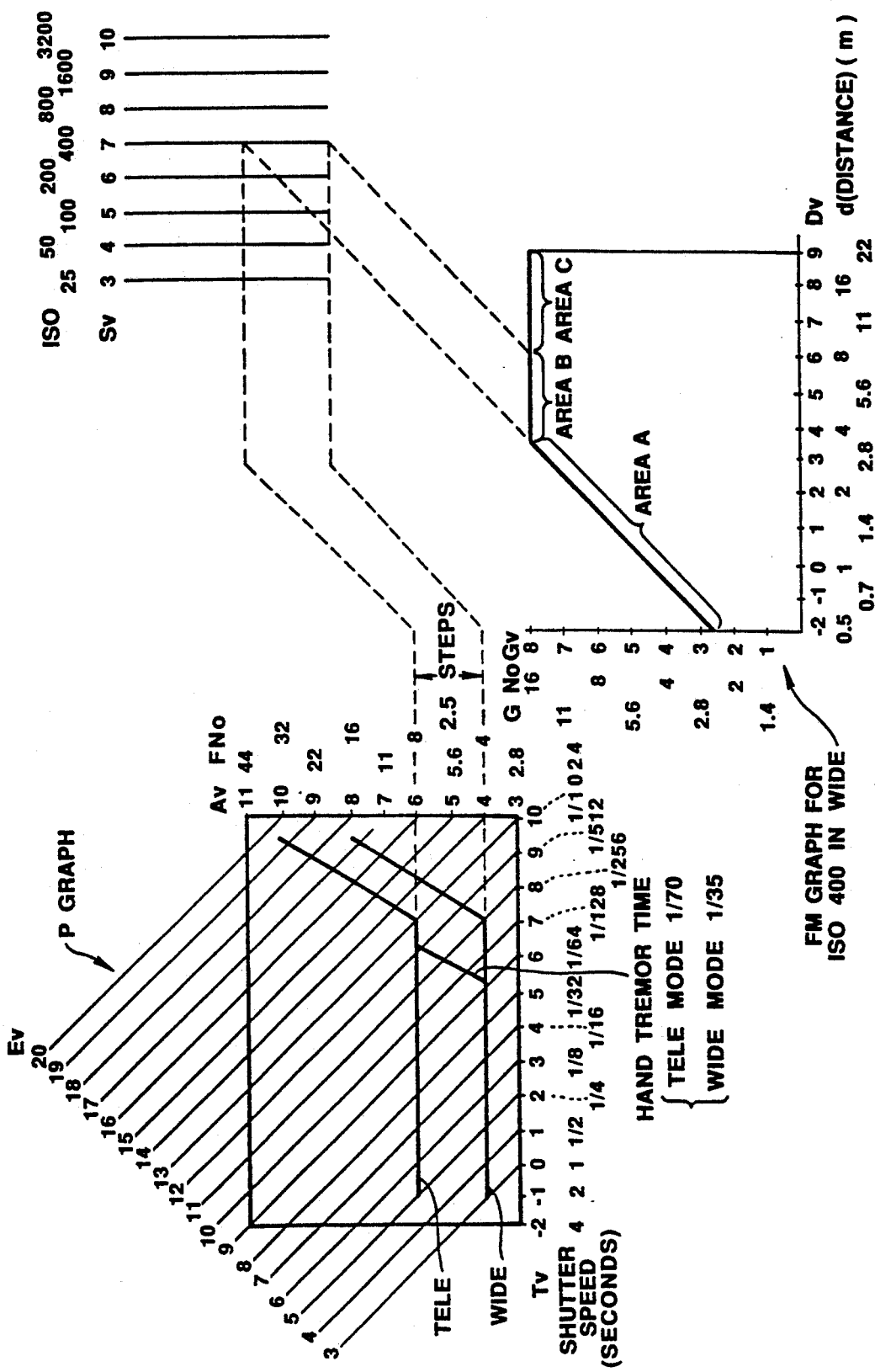
FIG. 9 shows a P graph and an FM graph employed for exposure control for the camera shown in FIG. 3.

FIG. 9 shows a program (P) graph and a flashmatic (FM) graph. This camera is a zoom camera. The f-number (hereafter, FNo) expressing the size of an aperture diaphragm varies with the zoom level. Therefore, two lines shown in the P graph on the left upper part of FIG. 9 indicate Tele and Wide characteristics. For zoom levels between Tele and Wide levels, shutter speeds and FNos are specified in the space between the two lines. On the other hand, the FM graph shown on the right lower part of FIG. 9 shows the relationship between the distance to a subject and the Gv value for wide photography with a film sensitivity ISO400. As illustrated, a flashing area is divided into three areas; areas A, B, and C. Within an area A, a G No is controlled in such a manner that flashing is done for a flashing time associated with a distance to a subject or a flashing time shorter than that for full flashing when an aperture diaphragm is shrunk at most 2.5 steps from its full open state. Within an area B, a FNo is controlled in such a manner that a strobe will flash at full when the aperture diaphragm is shrunk at most 2.5 steps from its full open state. In an area C, a strobe flashes at full with the aperture diaphragm opens fully.

Figure 10:
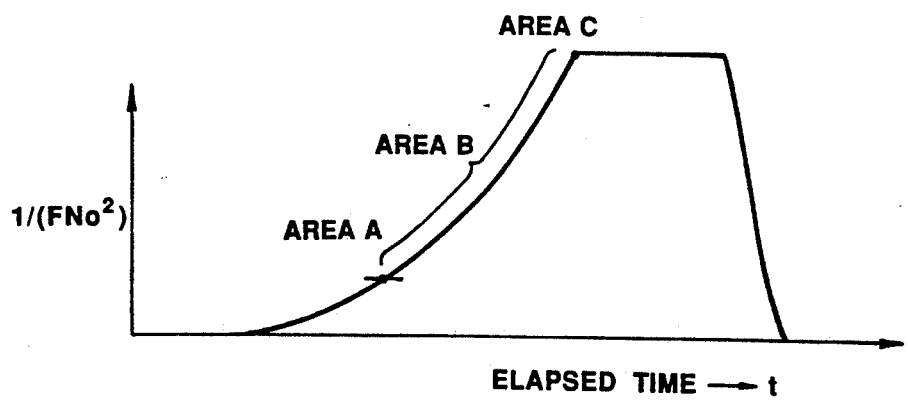
FIG. 10 is a graph showing an aperture waveform for a shutter of the camera shown in FIG. 3.

The areas B and C are full flashing areas. In the area B, the flashing time is varied to change FNos for flashing. Therefore, the area B ensures optimal exposure. However, in the area C, full flashing is done with the aperture diaphragm fully open. The exposure cannot be increased any longer. Therefore, the longer the distance is, the greater the extent of underexposure becomes. In the area A, the shorter the distance is, the shorter the flashing time becomes and the smaller the G No becomes. Thus, optimal exposure is ensured. When the zoom point or ISO sensitivity changes, a line on the FM graph shifts accordingly. Focusing points applied to the areas are plotted as an aperture curve in FIG. 10.

Next, various computations required to execute control based on the P and FM graphs of FIG. 9 will be described.

First, a hand tremor time represents seconds for which a hand tremor is likely to occur, and is usually provided as 1/(focal length). Assuming that focal lengths for Tele and Wide modes are 70 mm and 35 mm, the hand tremor times for Tele and Wide mode become 1/70 sec and 1/35 sec as indicated with straight lines in the P graph. These seconds of hand tremor times for Tele and Wide modes are stored in memory. A hand tremor time for an intermediate zoom level is calculated by performing interpolation. Alternatively, hand tremor times may be stored in association with various zoom levels.

When a main capacitor $11b$ is not fully charged, assuming that a maximum flashing time is 2560 us, Gv values for full flashing relative to charging voltages are computed using Gv values at 2560 us on reference curves for the charging voltages in FIG. 4, and the data of Table 2 listing differences from a Gv value for full charging and full flashing, which are stored in an $E^2R$-POM of a memory circuit 13.

Next, how to calculate a shutter speed will be described.

Figure 11:
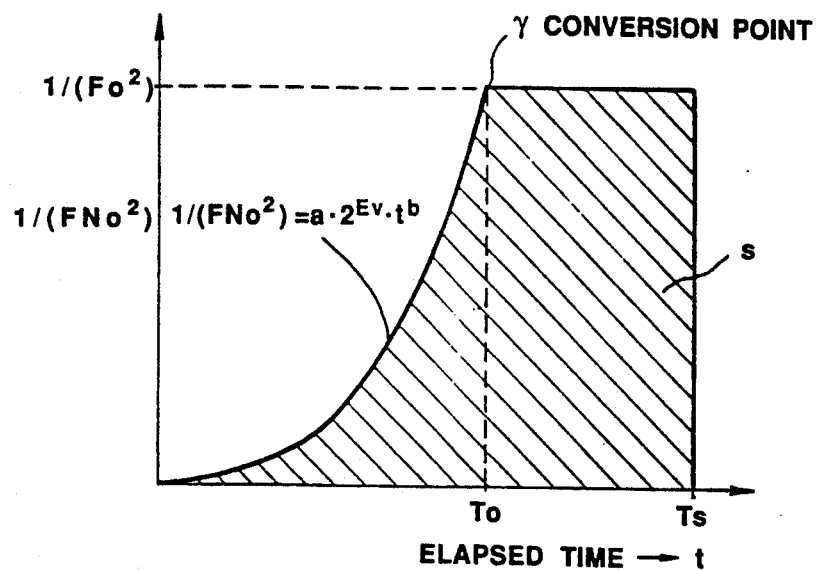
FIG. 11 is a graph showing a trapezoidal area of an aperture waveform for a shutter for the camera shown in FIG. 3.
Figure 12:
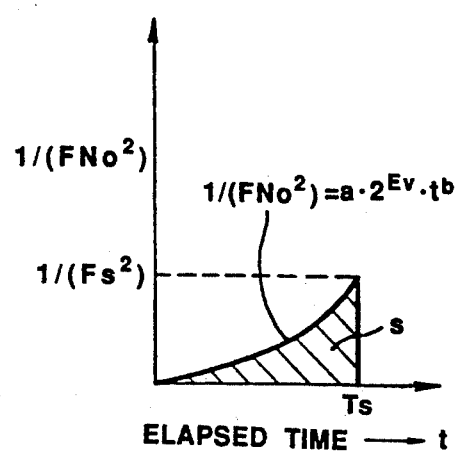
FIG. 12 is a graph showing a triangular area of an aperture waveform for a shutter for the camera shown in FIG. 3.

In the camera of this embodiment, a shutter speed is provided as an approximate value based on an aperture waveform that is divided into a trapezoidal area shown in FIG. 11 and a triangular area shown in FIG. 12.

Now, t denotes an elapsed time, and Ts, a shutter speed to be calculated. Fo denotes an f-number expressing the size of a fully-opened aperture diaphragm. To denotes a time in seconds elapsed before a gamma conversion point or a point on an aperture waveform indicating Fo or an FNo expressing the size of a fully-opened aperture diaphragm is attained. Fow denotes an FNo expressing the size of the fully-opened aperture diaphragm in Wide mode. Zv is a value varying with a zoom level, which takes on a 0 value in Wide mode, and grows larger as a zoom level approaches the Tele-mode level. Ev is a logarithm of a quantity determined with a subject luminance and a film ISO sensitivity. Av is a logarithm of an FNo ($=Log_2FNo^2$). Tv is a logarithm of an inverse value of a time t ($=Log_2(1/t)$). a and b are constants.

First, the aperture waveform in the triangle area is represented as the following expression:

$$1/FNo^2 = a \times 2^{-Zv} \times t^b \quad (3)$$

Both sides of the expression (3) are expressed logarithmically.

$$-Log_2 FNo^2 = Log_2 a - Zv + b \times Log_2 t \quad (4)$$

The above Av and Tv are assigned to the expression (4), then the assigned expression is simplified.

$$Log_2 a = b \times Tv - Av + Zv \quad (5)$$

Herein, assuming that the Tv and Av take on Tvo and Avo at the gamma conversion point, the expression (5) becomes as follows:

$$Log_2 a = b \times Tvo - Avo + Zv \quad (6)$$

Assuming that the Av value when the aperture diaphragm is fully open in Wide mode is Avow, the following relationship is established:

$$Avo = Avow + Zv \quad (7)$$

An exposure S for the triangular area is obtained by integrating the expression (3) with an elapsed time. Namely:

$$\begin{aligned} S &= \int_0^t (1/(FNo)^2) dt \\ &= \int_0^t (a \times 2^{-Zv} \times t^b) dt \\ &= (a/(b+1)) \times 2^{-Zv} \times t^{(b+1)} \end{aligned} \quad (8)$$

An Ev value is given as a logarithm of an inverse number of the expression (8).

$$\begin{aligned} Ev &= -Log_2 S \\ &= -Log_2\{a \times 2^{-Zv} \times t^{(b+1)}/(b+1)\} \\ &= -Log_2 a + Log_2(b+1) + Zv - (b+1)Log_2 t \end{aligned} \quad (9)$$

$Tv = -Log_2 t$ and the expression (6) are assigned to the expression (9). Then, the expression below results.

$$Ev = (b+1) \times Tv + Log_2(b+1) - b \times Tvo + Avow - Zv \quad (10)$$

Assuming that the Ev value at the gamma conversion point is Evo, the following expression ensues:

$$\begin{aligned} Evo &= (b+1) \times Tvo + Log_2(b+1) - b \times Tvo + Avow - Zv \\ &= Tvo + Avow + Log_2(b+1) - Zv \end{aligned} \quad (11)$$

Consequently, whether exposure control is performed according to the trapezoidal area of FIG. 11 or the triangular area of FIG. 12 is determined by assessing which of the inequalities below is satisfied.

For the triangular area;

$$Ev - Tvo - Avow - Log_2(b+1) - Zv \geq 0 \quad (12)$$

For the trapezoidal area;

$$Ev - Tvo - Avow - Log_2(b+1) - Zv < 0 \quad (13)$$

According to the triangular area, a Tv value representing a shutter speed is determined by the expression (10).

$$Tv = \{Ev - Log_2(b+1) + b \times Tvo - Avow + Zv\}/(b+1) \quad (14)$$

An actual shutter speed Ts is provided as:

$$Ts = 2^{-Tv} \quad (15)$$

On the other hand, an exposure S for the trapezoidal area is provided as mentioned below using the expression (8) and FIG. 11.

$$S = a \times 2^{-Zv} \times To^{(b+1)}/(b + 1) + \\ a \times 2^{-Zv} \times to^b \times (Ts - To) \\ = a \times 2^{-Zv} \times To^{(b+1)} \times (Ts - (b/(b + 1)) \times To) \quad (16)$$

An Ev value is provided as:

$$Ev = -\text{Log}_2 S \quad (17)\\
= -\text{Log}_2\{a \times 2^{-Zv} \times To^b \times (Ts - (b/(b + 1))To)\} \\
= -\text{Log}_2 a + Zv - b \times \text{Log}_2 To \\
- \text{Log}_2(Ts - (b/(b + 1)) \times To)$$

Then, $Tvo = -\text{Log}_2 To$ and the expression (6) are assigned to the expression (17).

$$Ev = -(b \times Tvo - Avo + zv) - Zv + b \times Tvo \quad (18)\\
- \text{Log}_2(Ts - (b/(b + 1)) \times To) \\
= Avo - \text{Log}_2(Ts - (b/(b + 1)) \times To)$$

Furthermore, the expression (7) is assigned to the expression (18).

$$Ev = Avow + Zv - \text{Log}_2(Ts - (b/(b+1)) \times To) \quad (19)$$

Then, a shutter speed for the trapezoidal area is expressed using the expression (19) as follows:

$$Ts = 2^{-(Ev - Avow - Zv)} + (b/(b+1)) \times To \quad (20)$$

The aforesaid calculations for a shutter speed will be summarized.

First, an area is determined according to the expression below.

A triangular area is selected when the following expression is met:

$$Ev - P1 - Zv \geq 0 \quad (21)$$

A trapezoidal area is selected when the following expression is met:

$$Ev - P1 - Zv < 0 \quad (22)$$

A shutter speed for each area is calculated as follows:
For the triangular area;

$$Ts = 2^{-P3 \times (Ev + P2 - Zv)} \quad (23)$$

For the trapezoidal area/

$$T2 = 2^{-(Ev - Avow - Zv)} + P4 \quad (24)$$

where, P1 to P4 denotes the values below.

$P1 = Tvo + Avow + \text{Log}_2(b+1)$ $P2 = b \times Tvo - Avow - \text{Log}_2(b+1)$ $P3 = 1/(b+1)$ $P4 = (b/(b+1)) \times To$ The P1 to P4 values are unique to each camera. When the P1 to P4 values are stored in an E²PROM, a shutter speed can be calculated using the simple expressions (21) to (24). If the timing that light shielded by a photo-interrupter (PI) attached to a shutter blade is transmitted disagrees with the timing that shutter blades start opening, the disagreement specific to each camera is stored in the E²PROM. The value of disagreement is added to a shutter speed calculated according to the expression (23) or (24). Thus, a corrected shutter speed is obtained.

Next, how to calculate a Gv value necessary to control strobe lighting will be described.

A G No is provided as the following expression:

$$G No = FNo \times d \times (S(100)/S)^{\frac{1}{2}} \quad (25)$$

where, d is a distance to a subject, and S, an ISO sensitivity of film. Both sides are squared and expressed logarithmically.

$$\text{Log}_2 G No^2 = \text{Log}_2 FNo^2 = \text{Log}_2 d^2 + \text{Log}_2 S(100) - \text{Log}_2 S \quad (26)$$

Then, the terms are replaced as follows:

$Gv = \text{Log}_2 G No^2$ $Av = \text{Log}_2 FNo^2$ $Dv = \text{Log}_2 d^2$ $Sv(100) = \text{Log}_2 S(100)$ $Sv = \text{Log}_2 S$ Then, these equations are assigned to the expression (26).

$$Gv = Av + Dv + Sv(100) - Sv \quad (27)$$

The Gv value becomes smallest when the aperture diaphragm is open fully. Assuming that the smallest Gv value is Gvmin, Gvmin is provided as the expression below.

$$Gvmin = Avo + Dv + Sv(100) - Sv \quad (28)$$

Then, the expression (7) is assigned to the expression (28).

$$Gvmin = Avow + Zv + Sv(100) - Sv \quad (29)$$

The Gvmin is compared with a Gv value specifying a quantity of light for full flashing, thus determining whether flashing control can be done. In practice, as described previously, a Gv value one step lower than the Gvmin provides unimpeachable photographs. Therefore, a Gv value (Gvmin−1) or a value one step lower than the Gvmin is used to determine whether flashing control can be done.

Next, how to calculate a pre-flashing time required to control strobe lighting or a flashing time will be described.

When the charging voltage of a strobe drops, the Gv value for full flashing decreases. Assuming that a Gv value for full flashing with the strobe fully charged is Gvm, a loss of the Gv value for full flashing due to a charging voltage drop is ΔGv (V), a Gv value for any charging voltage is given as follows:

$$Gv = Gvm - \Delta Gv(V) \tag{31}$$

When the expression (31) is assigned to the expression (27):

$$Gvm - \Delta Gv(V) = Avf + Dv = Sv(100) - Sv$$

where, Avf is an Av value for an f-number for flashing. Then, the Avf value is provided as follows:

$$Avf = Gvm - \Delta Gv(V) - Dv - Sv(100) + Sv \tag{32}$$

The Avf represents an optimal Av value for full flashing. When an Av value is within 2.5 steps from a value provided with a fully-opened aperture diaphragm in FIG. 9. strobe lighting is controlled according to a strobe control area B in the FM graph. When an Av value is beyond the range of the 2.5 steps, the value may be deduced according to either of the areas A and C. These relations are summarized below. When an optimal Av value for full flashing, Avf, meets any of the conditions below, the area A, B, or C is specified; that is to say, the area A is specified when:

$$Avo + 2.5 < Avf \tag{33}$$

the area B is specified when:

$$Avo < Avf < Avo + 2.5 \tag{34}$$

the area C is specified when:

$$Avf < Avo \tag{35}$$

Then, the Avf value based on the area A or C is fixed to Avo+2.5 or Avo.

When $Log_2 a$ and Zv are deleted from the expressions (5) and (6), the following expression is provided:

$$Tv = Tvo + (Av - Avo)/b$$

Herein, Av is replaced by Avf. Moreover, since the shutter speed Tv is represented as $-Log_2 t$ and $t = 2 - Tv$ is established, a pre-flashing time Tf is replaced by t. Namely:

$$Tf = 2^{-\{Tvo + (Avf - Avo)/b\}} \tag{36}$$

Next, how to obtain a strobe flashing time for G No control will be described.

According to the areas B and C, full flashing control is performed. According to the area A, G No control is carried out. A flashing time for G No control must be specified. An Av value for flashing is a value 2.5 steps lower than that obtained with the aperture diaphragm fully opened. Therefore, Avo+2.5 is assigned to Av in the expression (27). Then, the Gv value is provided as follows:

$$Gv = Avo + 2.5 + Dv + Sv(100) - Sv \tag{37}$$

The Gv value thus provided is a required Gv value. As shown in FIG. 4, when tables each listing the numbers of steps descending from a Gv value for full charging and full flashing versus the flashing times are stored in association with multiple charging voltages in memory, an approximate charging voltage table is referenced using a Gv value calculated according to the expression (37). Then, a flashing time is retrieved.

However, in reality, if multiple tables shown in FIG. 4 are stored in a ROM, the ROM must have a very large capacity. Therefore, in this embodiment, a table listing Gv value correction values in association with charging voltages, similar to Table 2, is stored. The correction value is added to the number of steps representing a difference of a Gv value, then the Gv value is corrected using the added number of steps. This procedure permits a flashing time with high precision using only a single table.

For instance, when a required Gv value is expressed as a difference from a Gv value for full charging and full flashing, $\Delta Gv$, or $-4$ Ev, and a charging voltage is 270 V, a point c on a Gv2 (270 V) curve in FIG. 4 indicates a flashing time of 64 us. When Table 2 is used, assuming that a difference $\Delta Gv$ is $-4$ Ev and a charging voltage is 270 V, the number of correction steps of 1.1 Ev is fetched. Then, the value is added to the $\Delta Gv$ of $-4$ Ev to calculate a sum, $-2.9$ Ev ($= -4$ Ev$+1.1$ Ev). The sum is recognized as a correction value $\Delta Gv$ or a difference from a Gv value for full charging and full flashing converted according to a Gv0 (330 V) curve. Based on the value $\Delta Gv$ value, a point d is specified on the Gv0 (330 V) curve. Then, a flashing time of 64 us the point d indicates is brought about. In this embodiment, however, the data of Table 1 is referenced using the $\Delta Gv$ value to fetch a flashing time. That is to say, an actual Gv value specifying a quantity of light for full flashing for a strobe, Gvm, and an optimal Gv value, Gvx, are read from the memory circuit 13, then a difference between the Gvm and Gvx values, $\Delta Gv$, is calculated. Then, the table (Table 1) is referenced using the difference $\Delta Gv$ to fetch a strobe lighting time or flashing time.

As described previously, when an attempt is made to store many characteristic curves of charging voltages, a ROM must have a very large capacity. According to the present embodiment, only a limited storage capacity for storing the data of Table 1 listing characteristics for full charging and the data of Table 2 listing correction values relative to charging voltages alone is needed to permit strobe lighting control with high precision.

Figure 13:
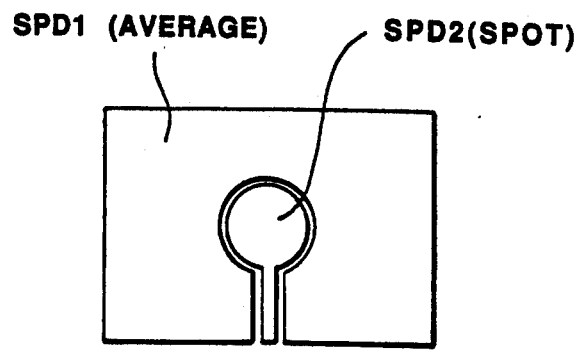
FIG. 13 shows a photometric pattern of a metering device employed for the camera shown in FIG. 3.

Next, photometry and backlight identification in the flashing controller of this embodiment will be described in conjunction with FIGS. 13 to 15. For backlight identification, an average luminance of subjects and a luminance of a main subject are measured, and a difference between the measured luminances is calculated. A silicon photodiode (hereafter, SPD) is divided into a periphery and a center, SPD 1 and SPD 2, as seen in FIG. 15 showing a photometric pattern for a metering device each of which may be employed to simplify backlight identification. The number of divisions may be increased. In this embodiment, however, as shown in FIG. 13, a two-division SPD including SPD 1 and SPD 2 is employed to receive light.

Many photometric circuits have been proposed for photometry in the past. Any of the circuits may be adopted. In this embodiment, a photometric circuit shown in FIG. 14 is employed. In the photometric circuit of FIG. 14, if amplification factors of transistors Tr5 and Tr6 are sufficiently large, a constant current I$\alpha$ is thought to flow through a diode D1 and a resistor R1. Therefore, a voltage V$\alpha$ producing base voltages of the transistors Tr5 and Tr6 is represented as the following expression:

$$Va = IaR1 + VT \times \ln(Ia/IS)$$

where, IS represents an inverse saturation current, and VT, a thermal voltage provided as $K \times T/q$.

When a peripheral SPD 1 is selected for average photometry, the output current Ip1 passes through a current mirror circuit made up of transistors Tr1 and Tr2, and flows into a transistor Tr5. Therefore, the value of an emitter voltage V1 of the transistor Tr5 is lower by a voltage $V_{BE}$ of the transistor Tr5 than the $Va$ value. When the diode D1, and the transistors Tr5 and Tr6 have the same characteristic, the emitter voltage V1 is represented as the expression below.

$$\begin{aligned} V1 &= Va - VT \times \ln(IP1/IS) \\ &= IaR1 + VT \times \ln(Ia/IS) - VT \times \ln(IP1/IS) \\ &= IaR1 + VT \times \ln(Ia/IP1) \end{aligned}$$

Thus, the emitter voltage is proportional to a logarithmically-compressed value of a luminance. Then, when the voltage V1 is selected as an input voltage of an operational amplifier OP1, an output voltage $V_{BV}$ is supplied. The output voltage $V_{BV}$ is provided as the expression below.

$$V_{BV} = LaR1 + VT \times \ln(Ia/IP1)$$

Figure 14:
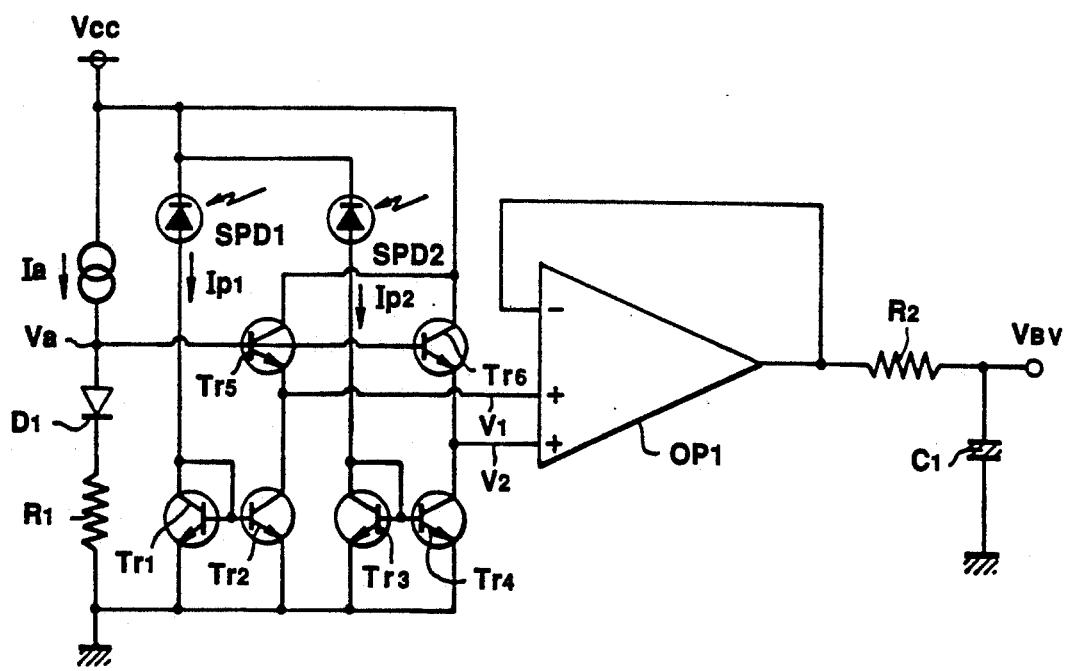
FIG. 14 is a circuit diagram of a photometric circuit employed for the camera shown in FIG. 3.
Figure 15:
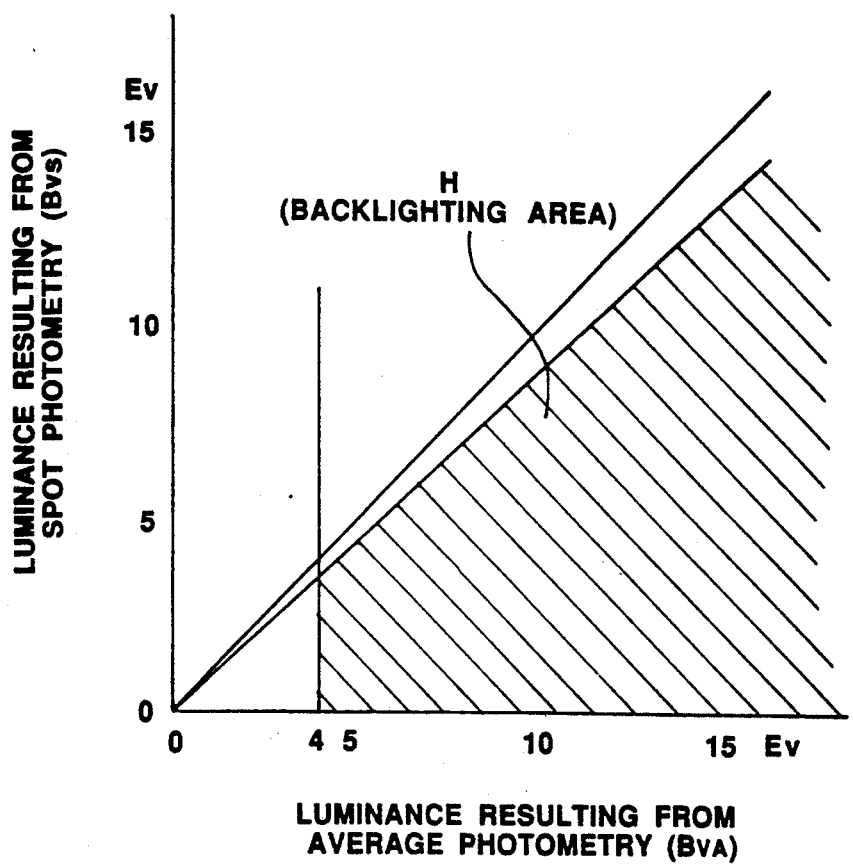
FIG. 15 is a graph of the luminance resulting from average photometry versus the luminance resulting from spot photometry for the camera shown in FIG. 3, showing a backlighting area.
Figure 16:
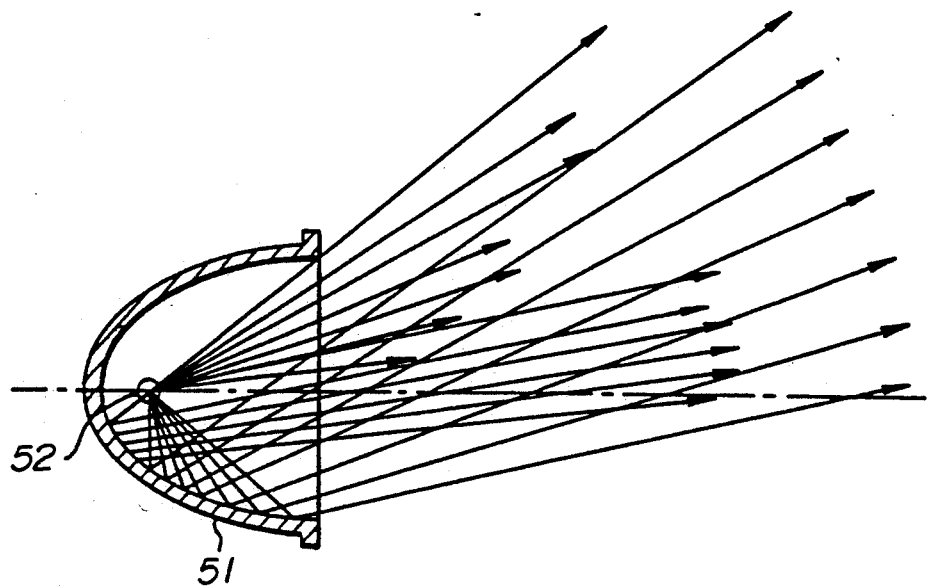
FIG. 16 shows reflection by a reflector in a strobe for a conventional camera.
Figure 17:
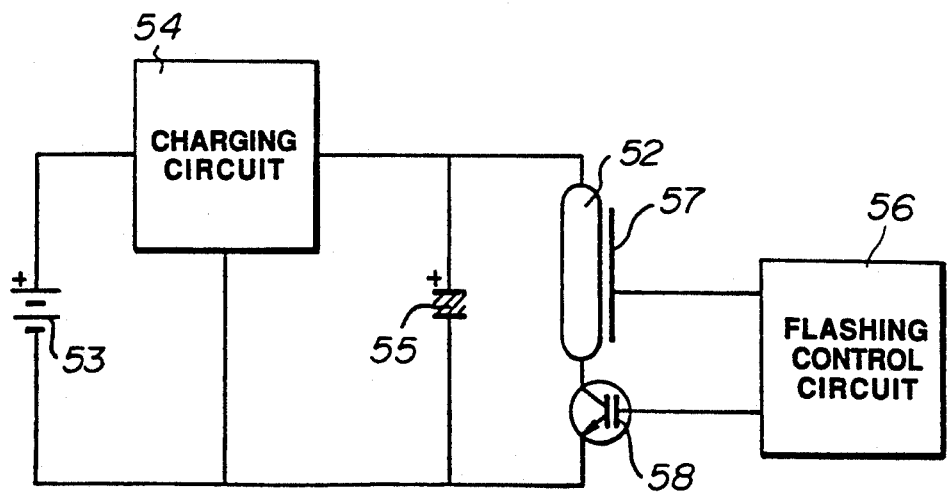
FIG. 17 is a circuit diagram of a strobe lighting circuit for the camera shown in FIG. 16.

In FIG. 14, a resistor R2 and a capacitor C1 serve as noise absorption devices for the output $V_{BV}$.

When a central (spot) SPD 2 is selected, an emitter voltage V2 of the transistor Tr6 is provided as follows:

$$V2 = IaR1 + VT \times \ln(Ia/IP2)$$

Transistors Tr3 and Tr4 also make up a current mirror circuit. When the voltage V2 is selected as an input voltage of the operational amplifier OP1, an output voltage $V_{BV}$ is supplied. The output voltage $V_{BV}$ is represented as the expression below.

$$V_{BV} = IaR1 + VT \times \ln(Ia/IP2)$$

A luminance value BV is proportional to a logarithmically-compressed value of a quantity of light. Therefore, the voltage values $V_{BV}$ obtained during average and spot photometries are converted into a digital form, then an average BV value (hereafter, $B_{VA}$) and a spot BV value (hereafter, $B_{VS}$) are calculated.

Conditions for backlight identification in this embodiment include;

$$B_{VA} \leq 4 \text{ Ev, and } B_{VS} \geq 0.9 \times B_{VA}.$$

An area H in FIG. 15 showing the relationship between the luminance resulting from average photometry and the luminance resulting from spot photometry is recognized as a backlight area. Then, when an SPD is divided into areas for average and spot photometries, a spot area has a smaller area than an average area as apparent from FIG. 13. Reliability in backlight identification for low luminances is low. Therefore, when $B_{VA}$ is less than 4 Ev, backlight identification is not carried out. A variation in luminance among portions of a subject is more intense when it is light than when it is dark. Therefore, the higher the luminance is, the larger the difference between the center and periphery becomes. This state should be regarded as backlighting, which will match general photographers' feelings. Therefore, in this embodiment, a coefficient in an identification condition is not set to 1 but to 0.9 so that the difference between the center and periphery will be intensified when luminance is high.

Table 3 lists states of exposing a main subject to light under various conditions in this embodiment.

TABLE 3

| Mode | Backlighted or not | Photometry Mode | Photometry Luminance | Flashed or not | Distance to a subject |
|---|---|---|---|---|---|
| Strobe Auto | Not | Average | High | Not | — |
|  |  |  | Low | Flashed | Near |
|  |  |  |  |  | Far |
|  | Backlighted | Spot | High | Flashed | Near |
|  |  |  |  |  | Far |
|  |  |  | Low | Flashed | Near |
|  |  |  |  |  | Far |
| Strobe Off | Not | Average | High | Not | — |
|  | Backlighted | Spot | Low | Not | — |

| Others | | Exposure | Exposure of a main |
|---|---|---|---|
| Shutter speed rounded or not | Exposure of a main subject | by strobe light | subject to outer light plus strobe light |
| Not | Optimal | — | Optimal |
| Rounded | Under | Optimal | Optimal to +1 Ev |
| Rounded | Under | Under | Under |
| Not | Optimal | Optimal | Optimal to +1 Ev |
| Not | Optimal | Under | Optimal |
| Rounded | Under | Optimal | Optimal to +1 Ev |
| Rounded | Under | Under | Under |
| Not | Optimal | — | Optimal |
| Not | Optimal | — | Optimal |

*"Under" stands for "underexposure."

As shown in Table 3, in the Strobe Off mode, when a main subject is not backlighted, exposure is carried out according to values resulting from average photometry. When backlighted, exposure is performed according to values resulting from spot photometry. A strobe flashes when the main subject has a low luminance or is backlighted. When a shutter speed is increased, a hand tremor occurs to produce a blurred photograph. In the Strobe Auto mode, a shutter speed is rounded so as not to cause a hand tremor.

When the main subject is backlighted, automatic exposure is usually controlled to underexpose the main subject to such an extent that the scene will be recognized as backlighted. Even when the luminance of the main subject is high enough, the main subject is often underexposed. Many cameras have had such an automatic exposure control in the past. However, during general photography, a photographer is seldom conscious whether or not a scene is backlighted. When photography is done in the light, even if a main subject is underexposed compared with the surrounding areas, the photographer often understands that the main subject is also bright. For instance, when a photograph is taken in a sunny skiing resort, if a subject lies in a remote place beyond the reach of strobe light, his/her face is photographed in black. Then, although it was a sunny day when photography was performed, underexposed photographs are produced. This will disappoint the photographer.

In the above case, this embodiment selects spot photometry. Even if a main subject is located too far for strobe light to reach, his/her face is exposed optimally. When a subject is located near and strobe light reaches sufficiently to expose the subject optimally, since outer light is combined with the strobe light, the subject is overexposed by one step. Nevertheless, the latitude of a photograph becomes wider as the degree of overexposure increases. Therefore, no problem occurs. In the Strobe Off mode, a strobe does not flash regardless of high or low luminance, or backlighting. As for photometric modes, similar to the Strobe Auto mode, average photometry is selected when photographs are taken with forward light, while spot photometry is selected when photographs are taken against backlight. Based on the results of the selected photometry, exposure control is carried out.

As described so far, the flashing controller according to the present invention references a memory means storing the relationships between the difference output and the flashing time of a flashing unit in association with outputs of differences between actual quantities of light for full flashing and optimal quantities of light, computes a flashing time, and thus controls strobe lighting. Therefore, according to the present invention, changes in quantity of flashlight relative to flashing times of a flashtube can be measured and stored in the memory means at a relatively early stage before manufacturing. Then, if G numbers of a strobe are varied due to design modification of a reflector, the data of quantities of flashlight and flashing times need not be rewritten and remain stored. On the other hand, the performance and variation in performance of an individual strobe reflector are established immediately before production. At this stage, actual quantities of light for full flashing may be written in memory. This helps commence production on schedule and reduce costs. Thus, the present invention provides many marked advantages including improved precision in determining a quantity of light.

What is claimed is:

1. A flashing controller, comprising:
   a flashing apparatus made up of a power circuit, a main capacitor charged by the power circuit, a flash discharge tube into which the main capacitor is discharged, a switching device for controlling on and off operations for a discharge current flowing in the flash discharge tube, and control circuits for controlling the switching device;
   a nonvolatile storing means for storing a first table listing a maximum flashing guide number for maximum flashing measured actually for each product of said flashing apparatus and flashing times associated with differences from the guide number for maximum flashing of said flashing apparatus;
   a distance measuring means for detecting a distance to a subject; and
   a microcomputer for computing an optimal light value guide number specifying an optimal quantity of light according to a distance to a subject said distance measuring means detects, computing a difference between quantities of light specified with a maximum flashing guide number stored in said nonvolatile storing means and with said optimal light value guide number, retrieving a flashing time from said first table existent in said nonvolatile storing means according to the difference between quantities of light, and controlling control circuits of said flashing apparatus according to the flashing time.

2. A flashing controller according to claim 1 wherein said nonvolatile storing means stores a second table for correcting a flashing time characteristic according to a charging voltage of said capacitor, means for detecting the charging voltage of said capacitor, said microcomputer including means to reference the second table and retrieve said corrected flashing time according to the detected charging voltage.

3. A flashing controller, comprising:
   a flashing apparatus for irradiating subjects;
   an optimal light value computing means for computing a quantity of light for optimal flashing, Gvx, of said flashing apparatus so that said subjects will be exposed to optimal light;
   a full flashing light value storing means for storing a quantity of light for full flashing, Gvm, of said flashing apparatus;
   a difference computing means for computing a difference between said quantity of light for optimal flashing, Gvx, and said quantity of light for full flashing, Gvm;
   a difference output/flashing time storing means for storing flashing times in association with differences from a quantity of light for full flashing;
   a means for retrieving a flashing time from said difference output/flashing time storing means according to said difference said difference computing means computes; and
   a flashing time controlling means for controlling a flashing time of said flashing apparatus according to a flashing time retrieved by said means for retrieving a flashing time.

4. A flashing controller according to claim 3 wherein said full flashing light value storing means is a nonvolatile memory, measures each product of said flashing apparatus actually, and stores a measured value.

5. A flashing controller according to claim 3 further comprising a storing means for storing a table for correcting said difference associated with a charging voltage of a main capacitor in said flashing apparatus, said computing means using this table to output a difference output that is corrected depending on the charging voltage.

6. A flashing controller, comprising:
   a flashing apparatus made up of a power circuit, a main capacitor charged by the power circuit, a flash discharge tube into which the main capacitor is discharged, and a switching device for controlling on and off operations for a discharge current flowing in the flash discharge tube;
   a first storing means for storing characteristic data determined in the process of designing the flashing apparatus;
   a second storing means for storing data based on errors from a designed value due to variations of parts and variations in assembly occurring when each product of said flashing apparatus is manufactured;
   a photometric means for metering a subject luminance;
   a distance measuring means for measuring a distance to a subject;
   a flashing start time computing means for computing a flashing start time for flashing by said flashing apparatus according to the outputs of said photometric means and said distance measuring means;
   a flashlight value computing means for computing an optimal quantity of flashlight for flashing by said flashing apparatus according to the outputs of said photometry means and distance measuring means, and the data stored in said first and second storing means; and a controlling means for controlling flashing of said flashing apparatus according to an output of said flashing value computing means and that of said flashing start timing computing means.

7. A flashing controller according to claim 6 wherein said first storing means stores characteristics of a quantity of flashlight relative to a flashing control time of said flashing apparatus, and said second storing means stores data associated with a maximum quantity of flashlight measured when each product of said flashing apparatus is manufactured.

8. A flashing controller according to claim 7 wherein said flashlight value computing means computes a value associated with an optimal quantity of light for optimal exposure according to the outputs of said photometric means and distance measuring means, calculates a difference between the value and said data of a maximum quantity of flashlight stored in said second storing means, and computes a flashing time using the difference and said data stored in said first storing means.

9. A flashing controller according to claim 6 further comprising a third storing means for storing correction data associated with charging voltages of a main capacitor in said flashing apparatus, and a charging voltage detecting means for detecting a charging voltage of said main capacitor, said flashlight value computing means computing an optimal quantity of flashlight for said flashing apparatus according to the correction data detected by said charging voltage detecting means and stored in said third storing means, the outputs of said photometric means and distance measuring means, and the data stored in said first and second storing means.

10. A flashing controller for a camera, comprising:
a flashing apparatus for irradiating light to subjects;
a first storing means for storing characteristic data determined in the process of designing the flashing apparatus;
a second storing means for storing data based on errors from a designed value due to variations of parts and variations in assembly occurring when each product of said flashing apparatus is manufactured;
a flashlight value computing means for computing an optimal quantity of flashlight for said flashing apparatus; and
a controlling means for controlling flashing of said flashing apparatus according to the output of the flashlight value computing means and the data stored in said first and second storing means.

11. A flashing controller according to claim 10 wherein said first storing means stores characteristics of a quantity of flashlight relative to a flashing control time of said flashing apparatus.

12. A flashing controller according to claim 10 wherein said second storing means stores data associated with a maximum quantity of flashlight measured when each of said flashing apparatus is manufactured.

13. A flashing controller, comprising:
a flashing apparatus made up of a power circuit, a main capacitor charged by the power circuit, a flash discharge tube into which the main capacitor is discharged, and a switching device for controlling on and off operations for a discharge current flowing in the flash discharge tube;
a first storing means for storing characteristic data determined in the process of designing the flashing apparatus;
a second storing means for storing data based on errors from a designed value due to variations of parts and variations in assembly occurring when each product of said flashing apparatus is manufactured;
a flashlight value computing means for computing an optimal quantity of flashlight for flashing by said flashing apparatus; and
a controlling means for controlling flashing of said flashing apparatus according to the output of the flashlight value computing means and the data stored in said first and second storing means.

14. A flashing controller according to claim 13 wherein said first storing means stores characteristics of a quantity of flashlight relative to a control time for a switching device in said flashing apparatus.

15. A flashing controller according to claim 13 wherein said second storing means stores data associated with a maximum quantity of flashlight measured when each product of said flashing apparatus is manufactured.

16. A flashing controller according to claim 13 further comprising a photometric unit for metering a subject luminance, and a distance measuring means for measuring a distance to a subject, said flashlight value computing means computing an optimal quantity of flashlight according to the outputs of said photometric means and distance measuring means.

17. A flashing controller according to claim 13 further comprising a third storing means for storing correction data associated with charging voltages of a main capacitor in said flashing apparatus, and a charging voltage detecting means for detecting a charging voltage of said main capacitor, said controlling means controlling flashing of said flashing apparatus according to the correction data selected according to the charging voltage detected by said charging voltage detecting means and stored in said third storing means, the output of said flashlight value computing means, and the data stored in said first and second storing means.

18. A method for operating flashing apparatus comprised of a power circuit, a main capacitor charged by the power circuit, a flash discharge tube into which the main capacitor is discharged, a switching device for controlling the discharge current of the flash discharge tube, and a control circuit for controlling the switching device, said method comprising the steps of:
(a) determining the actual flashing time of the flashing apparatus for each of a plurality of guide number values differing from a maximum guide number value over a predetermined range;
(b) storing the difference value between each guide number value and the maximum guide number value and the flashing time value associated therewith in a storing means;
(c) detecting the distance of a subject to be photographed;
(d) obtaining an optimal light value guide number specifying an optimal quantity of light responsive to the measured distance;
(e) determining the difference between the maximum flashing guide number stored in said storing means and said optimal guide number;
(f) obtaining the flash time value stored in said storage means and associated with the difference value in the storage means related to the difference value obtained at step (e); and (g) operating the control circuit by controlling the flashing time of the flashing apparatus according to the flashing time value obtained from said storage means.

19. The method of claim 18 further comprising the steps of:

determining a flashing time correction for the flash apparatus according to the charging voltage of said main capacitor;

storing said values in a second storage means;

measuring the charged voltage of the main capacitor;

selecting the correction value in said second storing means associated with the measured charging voltage; and correcting the flashing time according to the flashing time correction value retrieved from said second storage means.

20. A method for operating a flash apparatus comprised of a power circuit, a main capacitor charged by the power circuit, a flash discharge tube into which the main capacitor is discharged and a switching device for controlling the flash discharge tube and discharge current, said method comprising the steps of:

determining the flashing characteristics of the flash apparatus;

storing the flashing characteristics in a first memory;

determining deviations in actual operating characteristics of the flash apparatus from design objectives and storing the difference values in a second memory means;

measuring the luminance of a subject to be photographed;

measuring the distance of the subject to be photographed; computing a flashing start time according to the measured luminance and distance values;

determining an optimal quantity of flash light responsive to the measured luminance and distance values and the data stored in said first and second storage means; and controlling the flash apparatus according to the flash start timing value and the adjusted flashing value.

* * * * *

UNITED STATES PATENT AND TRADEMARK OFFICE
CERTIFICATE OF CORRECTION

PATENT NO. : 5,257,063
DATED : October 26, 1993
INVENTOR(S) : Toshiaki Ishimaru, Satoshi Kawakami It is certified that error appears in the above-indentified patent and that said Letters Patent is hereby corrected as shown below:

Column 1, line 20 change "U.S. Pat. No. 654818" to --U.S. Pat. Application Serial No. 654,818--.

Column 1, line 22 delete "Application Serial".

Column 1, line 23 after "Pat." insert --Application Serial--.

Column 5, Table 1, add as line 63 --5.0-- under first column of table and --25-- under second column of table.

Column 6, Table 2, line 10 change "255 V or less" to --225 V or less--.

Column 9, lines 35-36 change "$E^2RPOM$" to --$E^2PROM$--.

Column 12, line 18 change "$FNo^2=Log$" to --$FNo^2+Log$--.

Column 12, line 50 change "Avow+Zv+Sv" to --Avow+Zv+Dv+Sv--

UNITED STATES PATENT AND TRADEMARK OFFICE
CERTIFICATE OF CORRECTION

PATENT NO. : 5,257,063
DATED : October 26, 1993
INVENTOR(S) : Toshiaki Ishimaru, Satoshi Kawakami It is certified that error appears in the above-indentified patent and that said Letters Patent is hereby corrected as shown below:

Column 14, line 25 delete the first occurrence of the word "value".

Column 15, line 27 change "$V_{BV}=L\alpha R1$" to --$V_{BV}=I\alpha R1$--.

Column 15, line 52 change "$B_{VA} \leq 4$ Ev, and $B_{VS} \geq 0.9 \times B_{VA}$." to --$B_{VA} \geq 4$ EV, and $B_{VS} \leq 0.9 \times B_{VA}$.--

Signed and Sealed this

Thirteenth Day of September, 1994

Attest:

BRUCE LEHMAN

*Attesting Officer*  *Commissioner of Patents and Trademarks*